US012567904B2

(12) United States Patent
Al Sayeed

(10) Patent No.: US 12,567,904 B2
(45) Date of Patent: Mar. 3, 2026

(54) FIBER OPTIC CABLE FAULT LOCATING APPARATUS

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 380 days.

(21) Appl. No.: 18/191,084

(22) Filed: Mar. 28, 2023

(65) Prior Publication Data

US 2024/0333380 A1     Oct. 3, 2024

(51) Int. Cl.
*H04B 10/071*          (2013.01)
*H04B 10/079*          (2013.01)
(52) U.S. Cl.
CPC ......... *H04B 10/071* (2013.01); *H04B 10/079* (2013.01)
(58) Field of Classification Search
None
See application file for complete search history.

(56) References Cited

U.S. PATENT DOCUMENTS

| | | | | |
|---|---|---|---|---|
| 7,167,237 | B2 * | 1/2007 | Shimizu | G01M 11/3136 356/73.1 |
| 7,245,800 | B1 * | 7/2007 | Uhlhorn | H04B 10/00 385/24 |
| 8,014,670 | B2 * | 9/2011 | Moore | H04B 10/0791 356/73.1 |

| | | | | |
|---|---|---|---|---|
| 8,452,173 | B2 * | 5/2013 | Hehmann | H04Q 11/0067 398/16 |
| 8,509,621 | B2 | 8/2013 | Boertjes et al. | |
| 8,755,038 | B2 * | 6/2014 | Smith | G01M 11/3154 356/73.1 |
| 9,344,191 | B2 | 5/2016 | Al Sayeed et al. | |
| 9,485,013 | B2 | 11/2016 | Al Sayeed et al. | |
| 9,577,763 | B2 | 2/2017 | Al Sayeed et al. | |
| 9,768,902 | B2 | 9/2017 | Al Sayeed et al. | |
| 9,806,803 | B2 | 10/2017 | Bownass et al. | |

(Continued)

FOREIGN PATENT DOCUMENTS

| | | |
|---|---|---|
| EP | 3 804 184 B1 | 6/2022 |
| WO | 2020210269 A1 | 10/2020 |

(Continued)

*Primary Examiner* — Jai M Lee
(74) *Attorney, Agent, or Firm* — Baratta Law PLLC; Lawrence A. Baratta, Jr.

(57) ABSTRACT

Systems and methods for testing fiber optic cables are provided. A fiber optic cable testing apparatus, according to one implementation, includes a dedicated testing waveguide arranged within a first photonic device deployed in a data center having a plurality of photonic devices. The fiber optic cable testing apparatus further includes an external port arranged on the first photonic device, where the external port is connected to the dedicated testing waveguide and is configured to be connected to a fiber optic cable to be tested. While the fiber optic cable is connected to the external port during a testing stage, the dedicated testing waveguide is configured to transmit visible light to the fiber optic cable via the external port. The visible light includes one or more wavelengths that are visible to the human eye. Also, faults associated with the fiber optic cable, if any, are visually detectable by a user.

19 Claims, 5 Drawing Sheets

(56) References Cited

U.S. PATENT DOCUMENTS

| | | | |
|---|---|---|---|
| 9,882,634 B1 | 1/2018 | Al Sayeed et al. | |
| 9,897,515 B2 * | 2/2018 | Smith | G01M 11/31 |
| 9,906,294 B2 | 2/2018 | Al Sayeed et al. | |
| 9,918,148 B2 | 3/2018 | Swinkels et al. | |
| 9,973,295 B2 | 5/2018 | Al Sayeed et al. | |
| 9,985,726 B1 | 5/2018 | Al Sayeed et al. | |
| 9,986,317 B1 | 5/2018 | Al Sayeed et al. | |
| 10,014,942 B2 * | 7/2018 | Coffey | G02B 6/4292 |
| 10,063,313 B1 | 8/2018 | Al Sayeed et al. | |
| 10,237,011 B2 | 3/2019 | Al Sayeed et al. | |
| 10,270,526 B2 * | 4/2019 | Son | H04B 10/0779 |
| 10,361,957 B1 | 7/2019 | MacKay et al. | |
| 10,439,709 B1 | 10/2019 | Al Sayeed | |
| 10,481,041 B2 * | 11/2019 | Schell | G01M 11/333 |
| 10,491,296 B1 * | 11/2019 | Wellbrock | H04B 10/073 |
| 10,524,031 B2 * | 12/2019 | Younce | H04J 14/0267 |
| 10,536,235 B2 | 1/2020 | Al Sayeed et al. | |
| 10,560,212 B2 | 2/2020 | Al Sayeed et al. | |
| 10,587,339 B1 | 3/2020 | Al Sayeed et al. | |
| 10,686,543 B1 | 6/2020 | Al Sayeed et al. | |
| 10,833,791 B1 | 11/2020 | Al Sayeed | |
| 10,868,614 B2 | 12/2020 | Al Sayeed et al. | |
| 10,897,321 B1 | 1/2021 | Al Sayeed | |
| 10,985,838 B1 | 4/2021 | Al Sayeed et al. | |
| 10,992,374 B1 | 4/2021 | Miedema et al. | |
| 11,057,690 B2 | 7/2021 | Al Sayeed et al. | |
| 11,223,423 B1 | 1/2022 | Al Sayeed et al. | |
| 11,444,719 B2 | 9/2022 | Al Sayeed et al. | |
| 11,456,814 B2 | 9/2022 | Al Sayeed et al. | |
| 11,553,262 B1 | 1/2023 | Al Sayeed et al. | |
| 11,569,907 B2 | 1/2023 | Chen et al. | |
| 2011/0286746 A1 * | 11/2011 | Ji | H04J 14/0204 |
| | | | 398/83 |
| 2020/0228197 A1 * | 7/2020 | Bhatnagar | H04Q 11/0062 |
| 2022/0069903 A1 | 3/2022 | Chen et al. | |
| 2022/0166500 A1 | 5/2022 | Bownass et al. | |
| 2022/0255282 A1 | 8/2022 | Al Sayeed et al. | |

FOREIGN PATENT DOCUMENTS

| | | |
|---|---|---|
| WO | 2021141942 A2 | 7/2021 |
| WO | 2021162753 A1 | 8/2021 |
| WO | 2022072579 A1 | 4/2022 |

* cited by examiner

12

16

16

16

22    26

14    14

24

20    ⋯

18

22    26

⋯

24

10

FIBER OPTIC CABLE FAULT LOCATING APPARATUS

TECHNICAL FIELD

The present disclosure generally relates to networking systems and methods. More particularly, the present disclosure relates to fault location devices integrated within photonic network elements for allowing a user to visually locate faults in fiber optic cables and associated cable connectors.

BACKGROUND

A data center generally includes a plurality of photonic devices, which may be installed on a number of racks or shelves. Numerous fiber optic cables are used for connecting the photonic devices together and for connecting the photonic devices to external fiber spools extending from the data center. During installation and/or troubleshooting of the photonic devices and fiber optic cables, a technician can perform fault testing to ensure that the fiber optic cables are free of faults and are properly connected. Optical Time-Domain Reflectometry (OTDR) is one technique for testing cables and connections and is generally more complex than other techniques. A simpler technique for testing cables and connections, for instance, includes the use of hand-held fault location devices (e.g., Visual Fault Locators (VFLs), Visual Fault Identifiers (VFIs), fiber fault locators, fiber fault detectors, etc.). These hand-held fault location devices typically use a visible light source (e.g., laser diode, LED, incandescent bulb, etc.) that is configured to emit visible light into a fiber optic cable to be tested. Normally, the technician disconnects the fiber optic cable from the photonic device and then connects the fault location device to one end of the fiber optic cable to enable testing. Then, any leakage of light (e.g., through the cable itself, at a cable connector, at any downstream component or port, etc.) can be easily detected. The technician can thereby visually pinpoint any issues with the cables or connectors and remediate these issues as needed.

BRIEF SUMMARY

The present disclosure is directed to photonic devices deployed in an optical communication system and associated fiber optic cable testing apparatuses that may be integrated in the photonic devices. In one implementation, a fiber optic cable testing apparatus includes a dedicated testing waveguide arranged within a photonic device deployed in an optical communication system. The fiber optic cable testing apparatus further includes an external port arranged on the photonic device. The external port is connected to the dedicated testing waveguide and is configured to be connected to a fiber optic cable. While the fiber optic cable is connected to the external port during a testing stage, the dedicated testing waveguide is configured to transmit visible light to the fiber optic cable via the external port. The visible light includes one or more wavelengths that are visible to the human eye. Also, faults associated with the fiber optic cable, if any, are visually detectable by a user.

In some embodiments, the fiber optic cable testing apparatus may further include an optical source configured to emit the visible light. The optical source may be integrated in the photonic device. The fiber optic cable testing apparatus may further include an input test port arranged on the photonic device, wherein the optical source may be arranged external to the photonic device and may be configured to transmit the visible light to the dedicated testing waveguide via the input test port. The optical source may include a laser.

The fiber optic cable testing apparatus, according to some embodiments, may further include a plurality of dedicated testing waveguides arranged within the photonic device and a plurality of external ports arranged on the photonic device. Each of the plurality of external ports may be connected to a respective dedicated testing waveguide and may be configured to be connected to a fiber optic cable to be tested. The fiber optic cable testing apparatus may further include a controllable switch configured to switch the visible light to one or more of the dedicated testing waveguides and external ports. The fiber optic cable testing apparatus may also include a optical source arranged in the first photonic device. The first optical source may be configured to supply the visible light to the controllable switch. The controllable switch, in some embodiments, may be an M×N switch configured to receive input from the first optical source and a second optical source associated with an Optical Time Domain Reflectometry (OTDR) testing system. Also, the M×N switch may further be configured to supply the visible light and/or OTDR test signals to one or more of the plurality of dedicated testing waveguides and external ports. The fiber optic cable testing apparatus may further include an external test port arranged on the photonic device. In this case, the controllable switch may further be configured to switch the visible light to a fiber component via the external test port, wherein the fiber component may be configured to operate independently of the photonic device.

The external port of the fiber optic cable testing apparatus may be configured as an input port or output port for communicating photonic signals according to a primary function of the photonic device. For example, the photonic device may be a) an amplifier, b) a Raman amplifier, c) a Wavelength Selective Switching (WSS) device, d) a Reconfigurable Optical Add-Drop Multiplexer (ROADM) device, e) a photonic circuit card, f) a photonic circuit pack, g) a photonic line system, h) a Fiber Management and Routing System (FMRS), i) a patch panel system, or other suitable device. Also, the primary function of the photonic device may include a) amplifying photonic signals, b) multiplexing and/or demultiplexing photonic channels, c) controlling routes of photonic signals, and/or d) patching photonic signals from one photonic device to another. The one or more wavelengths of the visible light may be outside of operational spectrum associated with the primary function of the first photonic device and is configured not to interfere with communication of traffic channels in the operational spectrum.

The faults associated with the fiber optic cable that are visually detectable by the user may include a) a break in the fiber optic cable, b) a sharp bend of the fiber optic cable, c) a pinch in the fiber optic cable, d) a poorly-mated or loose cable connector, e) an open cable connector, f) an open port, g) improper light reflection or refraction in the fiber optic cable, h) excessive attenuation or loss in the fiber optic cable, and/or other faults. Any additional faults, if any, which may be associated with a test route extending upstream or downstream of an opposite end of the fiber optic cable, may also be visually detectable by the user. The test route, for example, may include one or more additional fiber optic cables and/or one or more additional photonic devices deployed in the data center.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
FIG. 1 is a diagram illustrating an embodiment of a data center in which multiple photonic devices are installed.

FIG. 1 is a diagram illustrating an embodiment of a data center 10 in which multiple photonic devices are installed. As shown in FIG. 1, the data center 10 includes a plurality of racks 12, where each rack 12 may include any number of photonic devices 14. For example, the photonic devices 14 may include amplifiers (e.g., Erbium-Doped Fiber Amplifier (EDFA), Raman amplifiers, etc.), Wavelength Selective Switching (WSS) devices, Reconfigurable Optical Add-Drop Multiplexer (ROADM) devices, switches, routers, photonic circuit cards, photonic circuit packs, photonic line systems, etc. The primary functions of the photonic devices 14 may include amplifying photonic signals, multiplexing and/or demultiplexing photonic channels, controlling data traffic routes of photonic signals, etc.

The photonic devices 14 may be configured to communicate with each other via a plurality of fiber optic cables 16. Some fiber optic cables 16, which may be shorter in length, can be used to connect photonic devices 14 on the same rack 12 or adjacent racks 12. Also, longer fiber optic cables 16 may be used to connect photonic devices 14 on different racks 12 located farther away from each other within the data center 10. For example, some longer fiber optic cables 16 may extend from one photonic device 14 in one room (or building) to another photonic device 14 in another room (or building).

The data center 10, as shown, also includes a plurality of patch panels 18 connected to the photonic devices 14 through fiber optic cables 20 (or fiber patch cables). The patch panels 18 are configured to extend communication paths or routes through the data center 10, which can help technicians and engineers at the data center 10 maintain the fiber optic cables 16 in an organized fashion. In some embodiments, the patch panels 18 may be used for relaying signals from a photonic device 14 located on a rack 12 in one room (or building) to another photonic device 14 located on a rack 12 in another room (or building). Generally, the patch panels 18 may also be considered to be another type of "photonic device," which, in this case, may be configured to passively relay optical signals from one photonic device 14 to another. The patch panels 18 may be related to or configured within a Fiber Management and Routing System (FMRS) or other circuits or systems that have the primary functions of controlling traffic routes of photonic signals, patching photonic signals from one photonic device 14 to another, etc.

Furthermore, the data center 10 includes a plurality of input/output cables 22 connected to input/output connectors 24. Each input/out connector 24 may include a pair of optical paths (i.e., bidirectional) for enabling input signals and outputs signals to be transmitted along external fiber spools 26 which are arranged in connection with one or more other data centers or nodes configured according to any suitable topology in a communications network.

Figure 2:
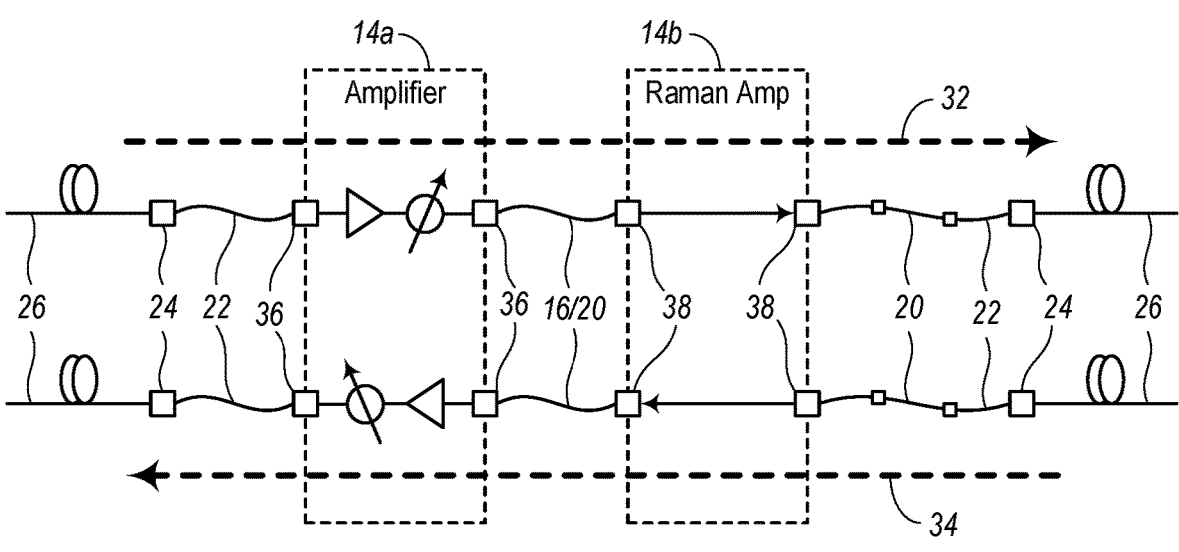
FIG. 2 is a diagram illustrating an embodiment of a bidirectional data traffic route through photonic devices.
Figure 2:

FIG. 2 is a diagram illustrating an embodiment of a bidirectional path 30 (e.g., within a data center) through one or more photonic devices 14. The bidirectional path 30 includes a first path 32 where photonic signals are transmitted in one direction (e.g., a west-to-east direction) and a second path 34 where photonic signals are transmitted in the opposite direction (e.g., an east-to-west direction). As shown in the example of FIG. 2, the bidirectional route 30 passes through a first photonic device 14a and a second photonic device 14b, where the first photonic device 14a is configured in this example as an amplifier and the second photonic device 14b is configured as a Raman amplifier. The first photonic device 14a includes a plurality of ports 36 (i.e., input ports and output ports) and the second photonic device 14b includes a plurality of ports 38 (i.e., input ports and output ports). It should be noted that the bidirectional path 30 may pass through any number or types of photonic devices 14, each of which may have any number of external ports. The bidirectional path 30 may also include the input/output cables 22 and the input/output connectors 24, as shown in FIG. 1, for connecting the first and second photonic devices 14a, 14b to the external fiber spools 26. Internal fibers along paths 32, 34 may include the above-mentioned fiber optic cables 16, 20.

On typical system deployments in the field, fiber optic cables 20 (e.g., patch cables) between photonic devices 14 and external fiber spools 26 may be routed over complex Fiber Management and Routing Systems (FMRSs), patch panels 18, patch panel bays, etc. To test any of the fiber optic cables 16, 20 for faults (e.g., during a testing, debugging, or troubleshooting stage), a Visual Fault Locator (VFL), as mentioned above, may be used. Again, the technician may use the VFL to shine a visible light through the fibers and look for any light that escapes from the fibers and/or connectors to locate faults. The visible light, in some embodiments, may be produced using a laser source configured to emit a red light.

Figure 3:
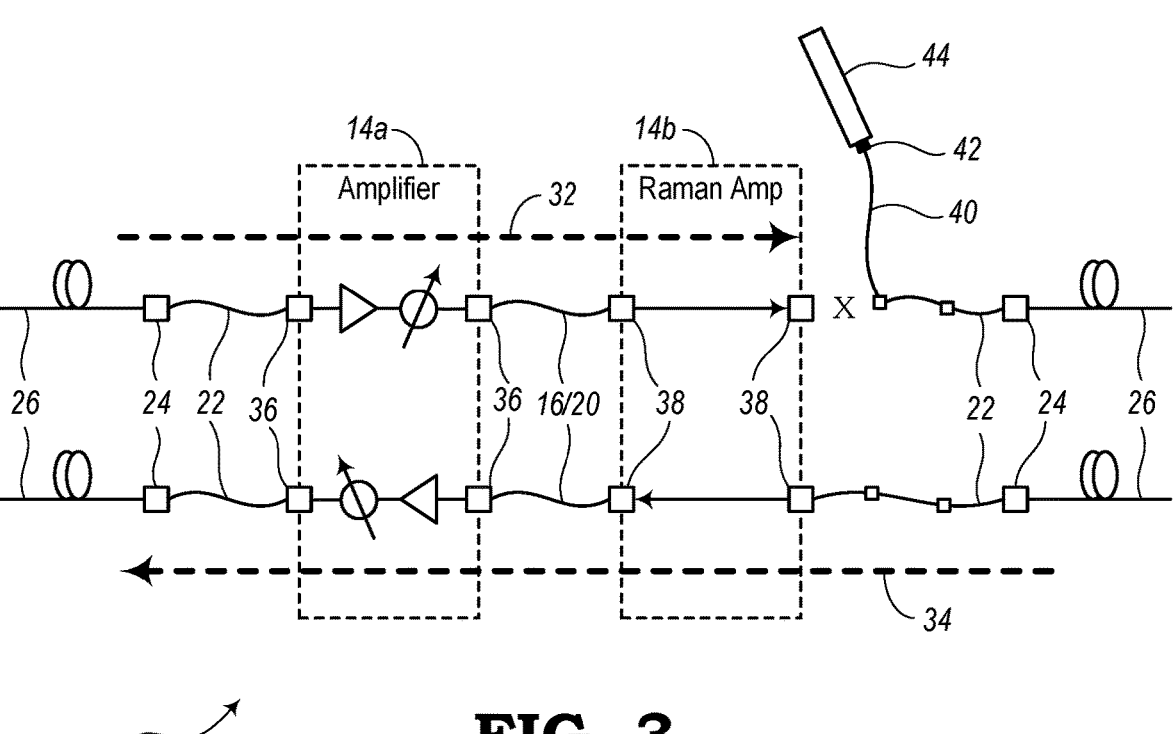
FIG. 3 is a diagram illustrating a conventional solution for testing a fiber optic cable.

FIG. 3 is a diagram illustrating a conventional solution for testing a fiber optic cable 40 (e.g., one of the fiber optic cables 16, 20 shown in FIGS. 1 and 2). In this example, in order to transmit the visible light along the fiber optic cable 40 to be tested, the technician disconnects the fiber optic cable 40 from the port 38, which in this example is associated with the second photonic device 14b. A connector 42 of the disconnected fiber optic cable 40 is then connected to an external VFL 44 having a source for generating a light that is transmitted along the fiber optic cable 40. In this example, the external VFL 44 may be used to expose faults in the fiber optic cable 40, as well as other cables (e.g., fiber optic cables 16, 20, input/output cables 22, etc.) along an end portion of the path 32 leading to the eastbound external fiber spool 26.

The test allows the technician to find the end points at patch-panels, loose connectors over the FMRS, or to detect sharp bending within Optical Time-Domain Reflectometry (OTDR) dead zones. However, one of the side effects of using an external source for identifying fiber faults, as described with respect to FIG. 3, is that by disconnecting and reconnecting the fiber from the faceplate of the external VFL 44, the technician may inadvertently contaminate the fiber tips at the faceplate of the second photonic device 14b or the fiber tips on the fiber optic cable 40 under test. It is generally known that this contamination can lead to the burning of the fiber tips at a later time, which may force the need to replace expensive circuit packs. Therefore, there is a need in the field of cable testing to eliminate the need to remove the cables and thereby expose sensitive elements to possible contamination.

Furthermore, some photonic devices 14 may be equipped with OTDR functionality built-in, allowing OTDR tests to be run without the need to remove cables. Thus, by requiring a technician to disconnect cables for testing them with the external VFL 44, these conventional strategies associated with FIG. 3 lose the benefits of having the built-in OTDR fiber testing system and may still set up a scenario where the technician could still contaminate the fiber tips. Therefore, there is a need to incorporate a fiber tester, by itself or along with an OTDR tester, into one or more of the photonic devices 14 for enabling testing without the need for a technician to remove cables. This would not only overcome the issues with conventional strategies but would also provide a low-cost solution to visually debug the data center 10 or other fiber plants without disconnecting cables from faceplates during testing. As such, the novel fault testing systems and methods of the present disclosure can be implemented, either by themselves or following OTDR runs in which OTDR dead zones are exposed.

The systems and methods of the present disclosure can automatically operate a "visible" source (e.g., about 400 nm to about 700 nm) that can normally remain in an out-of-service operation during normal operation of the data center 10. However, during testing, the visible source can emit visible light (i.e., light that is visible to a human) within the data center or fiber plant for debugging the data center, where the tests can be performed in a way to avoid any potential conflicts with normal traffic channels. For example, the data center 10 may operate in the C band (i.e., 1530 nm to 1565 nm), the C+L band (e.g., 1530 nm to 1625 nm), or other suitable bandwidths or channels.

During the test, the embodiments of the present disclosure are configured to locate or expose fiber faults within OTDR dead zones, find sharp bends or breaks within patch cables, detect loose or poorly-mated connectors, etc. Also, these faults can be found without the need to disconnect fiber optic cables. The visible source may be a laser source ranging from about 400 nm to about 700 nm. For example, the laser may emit red light (e.g., in a range from about 630 nm to about 670 nm). The laser may have high power (e.g., about 1 mW) at a single-mode fiber.

Figure 4:
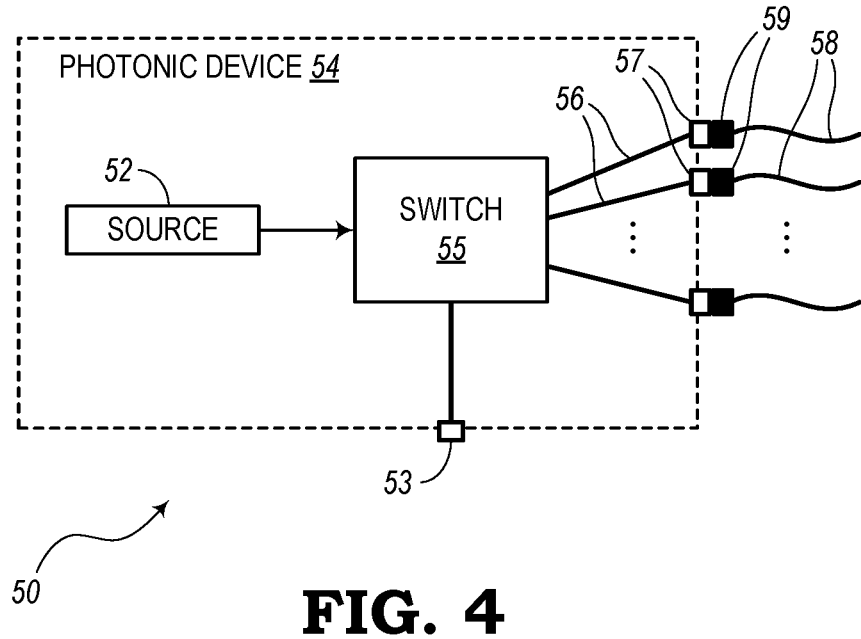
FIGS. 4-7 are diagrams illustrating fault locating systems, according to various embodiments of the present disclosure.
Figure 5:
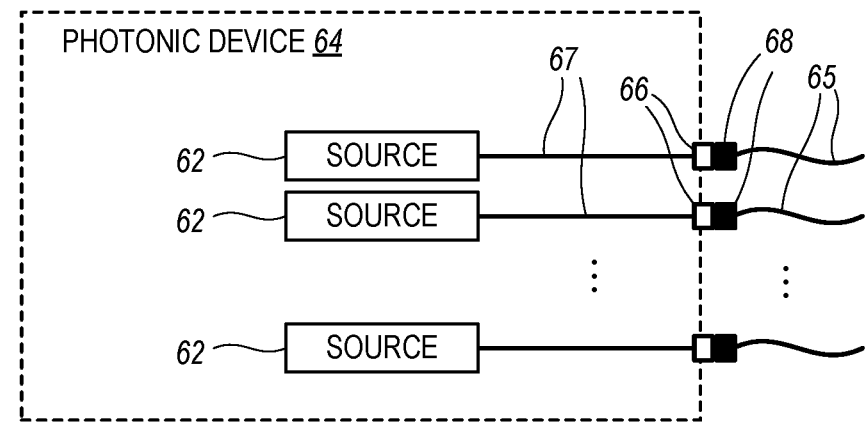
Figure 5:
Figure 6:
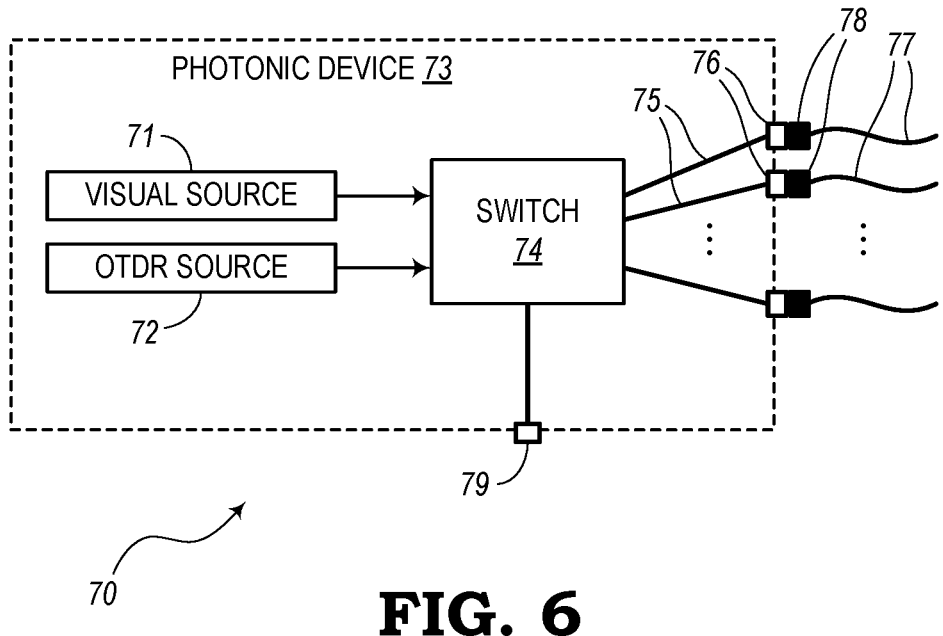
Figure 7:
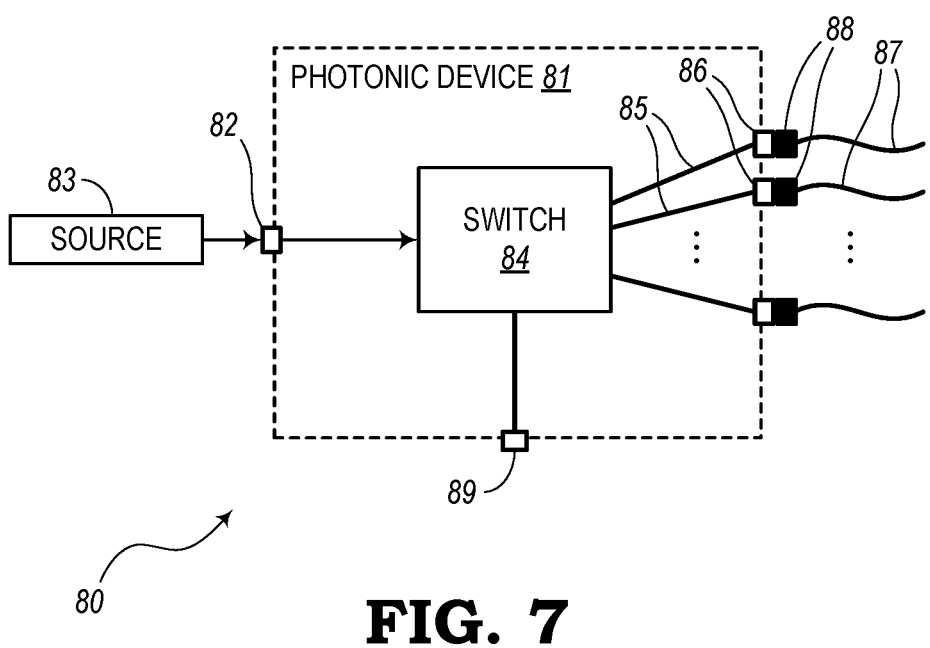

FIGS. 4-7 are diagrams illustrating various embodiments of fault locating systems integrated into photonic devices installed or deployed in a data center, central office, node, etc. FIG. 4 shows a first embodiment of a fiber optic cable testing apparatus 50 where a single source 52 is integrated within a photonic device 54. FIG. 5 shows a second embodiment of a fiber optic cable testing apparatus 60 where multiple sources 62 are integrated within a photonic device 64. FIG. 6 shows a third embodiment of a fiber optic cable testing apparatus 70 where a visual source 71 and an OTDR source 72 are integrated within a photonic device 73. Also, FIG. 7 shows a fourth embodiment of a fiber optic cable testing apparatus 80 where a photonic device 81 includes an input test port 82 for receiving visible light emission from an external source 83.

As shown in FIG. 4, the fiber optic cable testing apparatus 50 includes a switch 55 integrated in the photonic device 54 for receiving the internally generated light emission from the source 52. The switch 55 is configured to direct visible light along one or more of a plurality of dedicated testing waveguides 56, each connected to a respective one of a plurality of external ports 57. Each of the external ports 57 may be connected to a fiber optic cable 58 having a connector 59 configured to be attached to the respective external port 57. In operation, the source 52 is configured to generate visible light and provide the visible light to the switch 55. Based on control input, the switch 55 is configured to direct the light to any one or more of the dedicated testing waveguides 56 for transmitting light through the corresponding fiber optic cable 58. Light will normally pass through the fiber optic cable 58 being tested without any leakage if the fiber optic cable 58 is free of faults and has its connector 59 properly connected to the external port 57. However, if there is a fault in the fiber optic cable 58 and/or the connector 59 is improperly connected, light from the source 52 may be exposed, which will thereby viewable by the technician as a fault.

Furthermore, in some embodiments, the photonic device 54 may include an external test port 53, which may be connected to the switch 55 and may be configured to supply visible light to an externally connected device for testing a component or circuit for faults, where the component or circuit in this case may be external to the normal functionality of the data center 10 or photonic device 54.

As shown in FIG. 5, the fiber optic cable testing apparatus 60 does not include a switch, but instead includes a source 62 for each fiber optic cable 65 to be tested. Each source 62 is connected directly to an external port 66 via a respective dedicated testing waveguide 67. Thus, any source 62 can be activated during the testing stage to test the respective fiber optic cables 65 and their corresponding connectors 68. Of note, the sources 62 can be directly connected to each respective dedicated testing waveguide 67, such as via a coupler (not shown). In this manner, each respective dedicated testing waveguide 67 can be a port in the optical communication system, e.g., a line port, etc., and a respective source 62 can be turned on/off selectively to test this port.

As shown in FIG. 6, the fiber optic cable testing apparatus 70 includes both the visual source 71 and OTDR source 72 integrated within the photonic device 73. A switch 74, which may be configured as an M×N switch, is configured to receive one (or both) inputs from the visual source 71 and/or OTDR source 72 and provide one or more signals (e.g., visible light signals and/or OTDR signals) to one or more of a plurality of dedicated testing waveguides 75 leading to a plurality of external ports 76. The OTDR testing and visible light testing may be configured to test a plurality of fiber optic cables 77 connected to the external ports 76 via connectors 78.

Furthermore, in some embodiments, the photonic device 73 may include an external test port 79, which may be connected to the switch 74 and may be configured to supply visible light and/or OTDR signals to an externally connected device for testing a component or circuit for faults, where the component or circuit may be external to the normal functionality of the data center 10 or photonic device 73.

As shown in FIG. 7, the fiber optic cable testing apparatus 80 allows the external source 83 to emit visible light signals to the input test port 82, which is connected to a switch 84. The switch 84 is configured to direct the visible light signals along one or more selected waveguides of a plurality of dedicated testing waveguides 85 connected to a plurality of external ports 86. This allows testing of any one or more of a plurality of fiber optic cables 87 connected to the external ports 86 via respective connectors 88.

Furthermore, in some embodiments, the photonic device 81 may also include an external test port 89, which may be connected to the switch 84 and may be configured to supply visible light to an externally connected device for testing a component or circuit for faults, where the component or circuit may be external to the normal functionality of the data center 10 or photonic device 81.

According to additional embodiments, the sources 52, 62, 71, 72 (integrated within the respective photonic devices) and the switches 55, 74, 84 (integrated within the respective photonic devices) may be controlled by any suitable control circuit, computing system, Network Management System (NMS), technician's mobile device, etc. In some embodiments, the sources and switches may be controlled by the computing system of FIG. 8, as described in more detail below.

Control steps may include shutting off operational signal transmission throughout the related photonic device 54, 64, 73, 81, whereby the operational signal transmission may include optical signals in the C band, C+L band, etc. If OTDR testing is to be performed (FIG. 6), the OTDR test can be run using the OTDR source 72. The OTDR test can detect faults in the fiber optic cables and determine a distance to these faults. It may be noted that certain limitations with OTDR testing, the results may include dead zones, where the granularity of the OTDR test is insufficient to detect the exact locations of faults. To test specific locations of faults in the fiber optic cables 58, 65, 77, 87, according to the various embodiments, the sources 52, 62, 71, 83 generate the light signals and the switches 55, 74, 84 may be configured to supply light emission to selected cables. At this point, the technician can visually inspect the cables and corresponding connectors under test. It should also be noted that, with sufficient power, the light test may be able to transmit light along long distances of cables and other photonic devices along a path or route within the data center 10. Thus, the technician may walk throughout the data center 10 to look for light escaping from faulty cables, connectors, loosely connected cables, and other faults. If a faulty cable, connector, or connection is found, the technician can replace the cable and/or reconnect a loose or open connector.

The sources 52, 62, and 71 may be optical sources integrated in the photonic devices 54, 64, 73, respectively. The source 83 may an external optical source connected to the photonic device 81. The optical sources may include a laser diode that can emit visual light to at least one or more faceplate ports. The optical sources can be integrated with an M×1 optical switch that can route the visual light towards any line-interfacing faceplate ports. If there is an existing OTDR source integrated in the photonic device, as shown in FIG. 6, the switch 74 can be an M×N switch. In some embodiments, the visual light emission from the visible source 71 can be mutually exclusive from OTDR operations of the OTDR source 72.

The sources 52, 62, 71, 83 may generate light within about 400-700 nm to keep it within a human-eye visible or visual range. For safety purposes, when a light source is turned on for a given port (e.g., line-out or line-in), then other light sources in that direction (e.g., amplifiers) can be shut off. Therefore, this safety measure may reduce the risk of damage to the eyes of the technicians from harmful radiation. With the source on, the technician can search for and locate open or poorly-mated connectors within fiber management and routing systems, patch panel boxes, cables with sharp-bending, pinches, and/or breaks (e.g., within the OTDR dead zones). Again, this fault location can be performed without disconnecting any of the fibers from the faceplate ports.

Therefore, according to various embodiments, the present disclosure may be directed to a fiber optic cable testing apparatus (e.g., fiber optic cable testing apparatuses 50, 60, 70, 80) that includes a dedicated testing waveguide arranged within a first photonic device deployed in a data center having a plurality of photonic devices. The fiber optic cable testing apparatus further includes an external port arranged on the first photonic device. The external port is connected to the dedicated testing waveguide and configured to be connected to a fiber optic cable to be tested. While the fiber optic cable is connected to the external port during a testing stage, the dedicated testing waveguide is configured to transmit visible light to the fiber optic cable via the external port. The visible light includes one or more wavelengths that are visible to the human eye. Also, faults associated with the fiber optic cable, if any, are visually detectable by a user.

In some embodiments, the fiber optic cable testing apparatus may further include an optical source configured to emit the visible light. The optical source may be integrated in the first photonic device. The fiber optic cable testing apparatus may further include an input test port arranged on the first photonic device, wherein the optical source may be arranged external to the first photonic device and may be configured to transmit the visible light to the dedicated testing waveguide via the input test port. The optical source may include a laser.

The fiber optic cable testing apparatus, according to some embodiments, may further include a plurality of dedicated testing waveguides arranged within the first photonic device and a plurality of external ports arranged on the first photonic device. Each of the plurality of external ports may be connected to a respective dedicated testing waveguide and may be configured to be connected to a fiber optic cable to be tested. The fiber optic cable testing apparatus may further include a controllable switch configured to switch the visible light to one or more of the dedicated testing waveguides and external ports. The fiber optic cable testing apparatus may also include a first optical source arranged in the first photonic device. The first optical source may be configured to supply the visible light to the controllable switch. The controllable switch, in some embodiments, may be an M×N switch configured to receive input from the first optical source and a second optical source associated with an Optical Time Domain Reflectometry (OTDR) testing system. Also, the M×N switch may further be configured to supply the visible light and/or OTDR test signals to one or more of the plurality of dedicated testing waveguides and external ports. The fiber optic cable testing apparatus may further include an external test port arranged on the first photonic device. In this case, the controllable switch may further be configured to switch the visible light to a fiber component via the external test port, wherein the fiber component may be configured to operate independently of the first photonic device.

The external port of the fiber optic cable testing apparatus may be configured as an input port or output port for communicating photonic signals according to a primary function of the first photonic device. For example, the first photonic device may be a) an amplifier, b) a Raman amplifier, c) a Wavelength Selective Switching (WSS) device, d) a Reconfigurable Optical Add-Drop Multiplexer (ROADM) device, e) a photonic circuit card, f) a photonic circuit pack, g) a photonic line system, h) a Fiber Management and Routing System (FMRS), i) a patch panel system, or other suitable device. Also, the primary function of the first photonic device may include a) amplifying photonic signals, b) multiplexing and/or demultiplexing photonic channels, c) controlling routes of photonic signals, and/or d) patching photonic signals from one photonic device to another. The one or more wavelengths of the visible light may be outside of operational spectrum associated with the primary function of the first photonic device and is configured not to interfere with communication of traffic channels in the operational spectrum.

The faults associated with the fiber optic cable that are visually detectable by the user may include a) a break in the fiber optic cable, b) a sharp bend of the fiber optic cable, c) a pinch in the fiber optic cable, d) a poorly-mated or loose cable connector, e) an open cable connector, f) an open port, g) improper light reflection or refraction in the fiber optic cable, h) excessive attenuation or loss in the fiber optic cable, and/or other faults. Any additional faults, if any, which may be associated with a test route extending upstream or downstream of an opposite end of the fiber optic cable, may also be visually detectable by the user. The test route, for example, may include one or more additional fiber optic cables and/or one or more additional photonic devices deployed in the data center.

Figure 8:
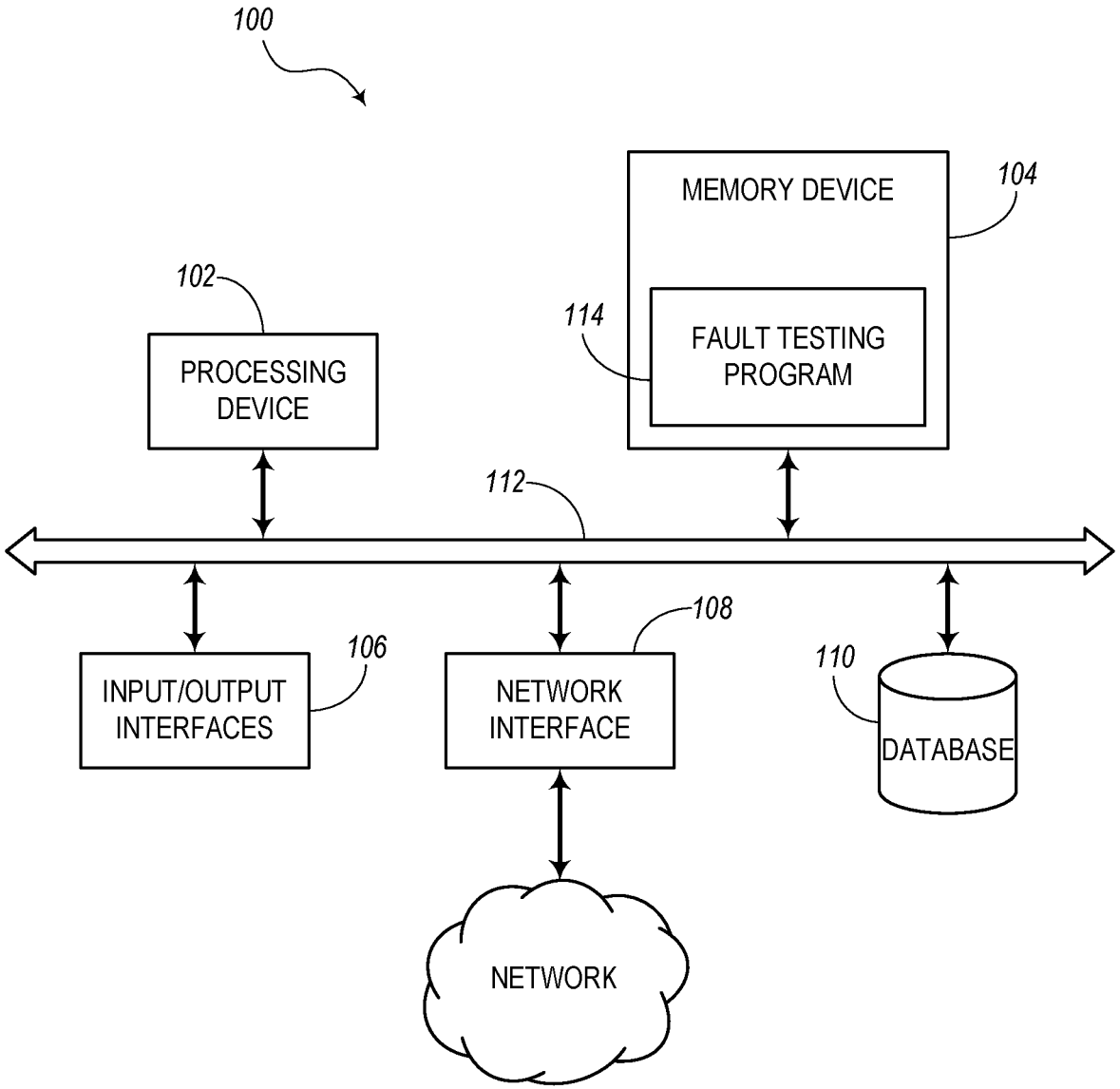
FIG. 8 is a block diagram illustrating an embodiment of a computing system for administering a fault location test.

FIG. 8 is a block diagram illustrating an embodiment of a computing system 100 for administering a fault location test. In the illustrated embodiment, the computing system 100 may be a digital computing device that generally includes a processing device 102, a memory device 104, Input/Output (I/O) interfaces 106, a network interface 108, and a database 110. It should be appreciated that FIG. 8 depicts the computing system 100 in a simplified manner, where some embodiments may include additional components and suitably configured processing logic to support known or conventional operating features. The components (i.e., 102, 104, 106, 108, 110) may be communicatively coupled via a local interface 112. The local interface 112 may include, for example, one or more buses or other wired or wireless connections. The local interface 112 may also include controllers, buffers, caches, drivers, repeaters, receivers, among other elements, to enable communication. Further, the local interface 112 may include address, control, and/or data connections to enable appropriate communications among the components 102, 104, 106, 108, 110.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

According to some embodiments, the computing system 100 may include a fault testing program 114. The fault testing program 114 may include computer logic, code, or instructions for enabling the processing device 102 to perform a fault test for testing the fiber optic cables and/or connectors associated with one or more a photonic devices in a data center or network node. The fault testing program 114 may be implemented in software and/or firmware in a non-transitory computer-readable medium, such as the memory device 104. In some embodiments, the fault testing program 114 may be implemented in hardware in the processing device 102. In other embodiments, the fault testing program 114 may be implemented in any suitable combination of hardware, software, and firmware.

In operation, the fault testing program 114 may be configured to send control instructions to the various sources 52, 62, 71, 72, 83 and switches 55 74, 84 to activate the appropriate sources and switches to send visible light to the respective external ports 57, 66, 76, 86, which in turn is connected fiber optic cables 58, 65, 77, 87 via connectors 59, 68, 78, 88. Thus, visible light is sent to selected cables for testing these cables as described in the present disclosure and allows the tested cables to remain connected without the need to disconnect the cable and expose sensitive fiber tips to possible contamination. The fault testing program 114 may further include a step of automatically shutting off the operational light transmission to enable testing without the risk of exposure of the technician or user to harmful light transmission.

Thus, according to the various systems and methods of the present disclosure, the cables being tested can remain connected to the faceplate ports or external ports. By allowing the cables to remain connected, there is no longer a need to disconnect the cables for testing, which can thereby greatly reduce (or eliminate) the risk of contaminating the ends of the cables or external ports or exposing the technician to harmful light emissions that can cause damage to the eyes.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A fiber optic cable testing apparatus comprising:
a dedicated testing waveguide arranged within a photonic device in an optical communication system; and
an external port arranged on the photonic device, the external port connected to the dedicated testing waveguide and configured to be connected to a fiber optic cable to be tested;
wherein, while the fiber optic cable is connected to the external port during a testing stage, the dedicated testing waveguide selectively transmits visible light having a wavelength in a range from about 400 nm to about 700 nm to the fiber optic cable via the external port, the visible light being generated by an optical source and transmitted via a dedicated optical path, the dedicated optical path being configured exclusively for the visible light and physically distinct from optical paths carrying communication signals of the photonic device, the dedicated testing waveguide being dedicated for visible-light transmission and mutually exclusive from any operational or diagnostic optical paths of the photonic device, the visible light being activated only during an out-of-service testing stage to avoid interference with live traffic, to enable visual detection of faults associated with the fiber optic cable while the fiber optic cable remains connected to the external port.

2. The fiber optic cable testing apparatus of claim 1, further comprising an optical source configured to emit the visible light, integrated in the photonic device.

3. The fiber optic cable testing apparatus of claim 1, further comprising an Optical Time Domain Reflectometry (OTDR) testing system, wherein the external port is utilized for both the OTDR testing system and the testing stage.

4. The fiber optic cable testing apparatus of claim 1, further comprising one or more dedicated testing waveguides arranged within the photonic device and one or more external ports arranged on the photonic device, each of the one or more external ports connected to a respective dedicated testing waveguide and configured to be connected to a fiber optic cable to be tested.

5. The fiber optic cable testing apparatus of claim 1, further comprising a controllable switch configured to switch the visible light to a plurality of dedicated testing waveguides and external ports.

6. The fiber optic cable testing apparatus of claim 5, further comprising a first optical source arranged in the photonic device, the first optical source configured to supply the visible light to the controllable switch.

7. The fiber optic cable testing apparatus of claim 6, wherein the controllable switch is an M×N switch configured to receive input from the first optical source and a second optical source associated with an Optical Time Domain Reflectometry (OTDR) testing system.

8. The fiber optic cable testing apparatus of claim 5, further comprising an external test port arranged on the photonic device, wherein the controllable switch is configured to switch the visible light to a fiber component via the external test port.

9. The fiber optic cable testing apparatus of claim 1, wherein the external port is configured as an input port or output port for communicating photonic signals according to a primary function of the photonic device.

10. The fiber optic cable testing apparatus of claim 9, wherein the photonic device is one of an amplifier, a Raman amplifier, a Wavelength Selective Switching (WSS) device, a Reconfigurable Optical Add-Drop Multiplexer (ROADM), a photonic circuit card, a photonic circuit pack, a photonic line system, a Fiber Management and Routing System (FMRS), and a patch panel system, associated with the optical communication system.

11. The fiber optic cable testing apparatus of claim 9, wherein one or more wavelengths of the visible light are selectively transmitted when traffic channels are not operational.

12. The fiber optic cable testing apparatus of claim 9, wherein one or more wavelengths of the visible light are outside of operational spectrum associated with the primary function of the photonic device and does not interfere with communication of traffic channels in the operational spectrum.

13. The fiber optic cable testing apparatus of claim 1, wherein the faults associated with the fiber optic cable include one or more of a break in the fiber optic cable, a sharp bend of the fiber optic cable, a pinch in the fiber optic cable, a poorly-mated or loose cable connector, an open cable connector, an open port, improper light reflection or refraction in the fiber optic cable, and excessive attenuation or loss in the fiber optic cable.

14. The fiber optic cable testing apparatus of claim 1, wherein the optical source is integrated within the photonic device and configured to remain inactive during normal operation of the photonic device and is selectively activated only during the testing stage.

15. The fiber optic cable testing apparatus of claim 1, further comprising a control circuit integrated within the photonic device configured to automatically deactivate operational optical signals transmitted through the photonic device upon activation of the visible light, to ensure technician safety during fault detection.

16. A photonic device deployed in an optical communication system, the photonic device comprising:
a dedicated testing waveguide; and
an external port connected to the dedicated testing waveguide, the external port configured to be connected to a fiber optic cable connected to the optical communication system;
wherein, while the fiber optic cable is connected to the external port during a testing stage, the dedicated testing waveguide selectively transmits visible light having a wavelength in a range from about 400 nm to about 700 nm to the fiber optic cable via the external port, the visible light being generated by an optical source and transmitted via a dedicated optical path, the dedicated optical path being configured exclusively for visible wavelengths and physically distinct from optical paths carrying communication signals of the photonic device, the dedicated testing waveguide being dedicated for visible-light transmission and mutually exclusive from any operational or diagnostic optical paths of the photonic device, the visible light being activated only during an out-of-service testing stage to avoid interference with live traffic, to enable visual detection of faults associated with the fiber optic cable while the fiber optic cable remains connected to the external port.

17. The photonic device of claim 16, further comprising a plurality of dedicated testing waveguides, a plurality of external ports, and a controllable switch, wherein each of the plurality of external ports is connected to a respective dedicated testing waveguide and configured to be connected to a fiber optic cable to be tested, wherein the controllable switch is configured to switch the visible light to one or more of the dedicated testing waveguides and external ports, and wherein the optical source is configured to supply the visible light to the controllable switch.

18. The photonic device of claim 17, wherein the controllable switch is an M×N switch configured to receive input from the optical source and a second optical source associated with an Optical Time Domain Reflectometry (OTDR) testing system.

19. The photonic device of claim 16, wherein the photonic device is one of an amplifier, a Raman amplifier, a Wavelength Selective Switching (WSS) device, a Reconfigurable Optical Add-Drop Multiplexer (ROADM), a photonic circuit card, a photonic circuit pack, a photonic line system, a Fiber Management and Routing System (FMRS), and a patch panel system, associated with the optical communication system.

* * * * *